United States Patent Office 2,802,880
Patented Aug. 13, 1957

2,802,880

HYDROXY-OCTAHYDRONAPHTHALENES

Max Stoll and Max Hinder, Geneva, Switzerland, assignors to Firmenich et Cie, Geneva, Switzerland, a Swiss company No Drawing. Application January 25, 1957,
Serial No. 636,252

15 Claims. (Cl. 260—617)

This invention is a continuation-in-part of our copending application Serial No. 422,686 filed April 12, 1954, now abandoned, and relates to new chemical compounds, to new compositions of matter having a new, strong and very interesting scent, and to a process for preparing the said new compounds and compositions of matter.

According to this invention, γ-dihydroionone (Formula I) is subjected to a ring closure with the aid of a cyclization agent, such as protons (hydrogen ions and substances furnishing hydrogen ions such as acids, $BF_3$ and the like) so as to form a bicyclic carbonium-ion (Formula II). The latter loses again one proton and yields, besides certain quantities of non-alcoholic by-products, a mixture of isomeric unsaturated tertiary, bicyclic alcohols (Formulae III, IV and V).

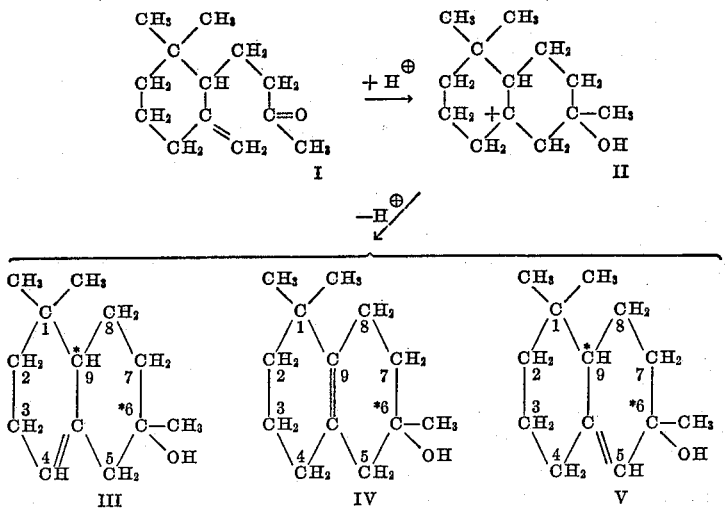

These alcohols may be separated from the crude reaction mixture, for instance, by a treatment with triethylborate. Two of these three isomeric alcohols occur in two stereoisomeric forms according to their two asymmetrical carbon atoms.

The most important of these alcohols is the alcohol of the Formula III, i. e., 1,1,6-trimethyl-6-hydroxy-1,2,3,5,6,7,8,9-octahydro-naphthalene. The second in importance of these alcohols is the alcohol of Formula IV, i. e., 1,1,6-trimethyl-6-hydroxy-1,2,3,4,5,6,7,8-octahydro-naphthalene.

Both these alcohols of Formulae III and IV have a new and interesting fragrance and are new and useful compounds for the perfume industry.

The alcohol of Formula V, i. e., 1,1,6-trimethyl-6-hydroxy-1,2,3,4,6,7,8,9-octahydro-naphthalene, only forms in very small quantities at the time of the ring closure mentioned above. Its odor is rather weak, so that its presence either in the mixture of the other two alcohols of Formulae III and IV, or in one or the other of these alcohols, does not substantially affect the odor of these products. This alcohol of Formula V gives two allophanates having a M. P. of 171° C. and respectively 161° C.

An object of this invention is, therefore, a new and useful industrial product with a new interesting scent, which is a mixture of the three isomers of Formulae III, IV and V. This new product mixture is characterized by the following features:

Boiling point:
 66–67° C. under 0.07 mm. Hg pressure
 76–80° C. under 0.25 mm. Hg pressure
 70–72° C. under 0.1 mm. Hg pressure Density at $\frac{18°}{4} = 0.964$ Refractive index $n\frac{19.8°}{D} = 1.498$ 3,5-dinitrobenzoate: M. P. 82–83° C.

This product gives allophanates melting, respectively, at 184° C., 183° C., 172° C. and 154° C., and epoxides ($C_{13}H_{22}O_2$), the principle melting at 55–56° C.

Further objects of the invention, also, are the new and industrial products comprising a mixture which contain only the two isomeric alcohols of Formulae III and IV, as well as the individual alcohols of Formulae III and IV separated from such mixtures.

If, in the above-mentioned ring closing, a mixture of α, β and γ isomers of dihydroionone is used as starting material in place of the pure γ isomer, substantially only the γ-isomer undergoes the ring-closure. This results in a mixture of α and eventually β-dihydroionones with 1,1,6-trimethyl-6-hydroxy-1,2,3,5,6,7,8,9-octahydronaphthalene, 1,1,6 - trimethyl - 6 - hydroxy - 1,2,3,4,5,6,7,8-octahydro-naphthalene, and a small quantity of 1,1,6-trimethyl - 6 - hydroxy - 1,2,3,4,6,7,8,9 - octahydro - naphthalene, from which the alcohols of Formulae III and IV can be easily separated by boratization and fractional distillation.

The new chemical compound having a strong new fragrance, designed as 1,1,6-trimethyl-6-hydroxy-1,2,3,5,6,7,8,9-octahydro-naphthalene (Formula III) has physical constants: B. P. 72° C. under 0.25 mm. pressure Hg; density $d_4^{20} = 0.9647$; refractive index $n_D^{20} = 1.498$, and giving allophanates melting at 183° C. and 184° C.

The new chemical compound designated as 1,1,6-trimethyl - 6 - hydroxy - 1,2,3,4,5,6,7,8 - octahydro-naphthalene (Formula IV) gives a single allophanate melting at 153–154° C. and having the following physical constants: B. P. 60–61° C. under 0.05 mm. Hg; $d_4^{18.4} = 0.970$; $n_D^{17} = 1.502$.

The present invention also includes a new process for preparing either the aforesaid new chemical compounds or the above new compositions of matter as mixtures. This new process consists in submitting γ-dihydroionone, a mixture of γ-dihydroionone and at least one of its isomeric dihydroionones, or acid hydrolizable keto derivatives of these dihydroionones to a ring closure with the aid of a cyclizing agent.

The ring-closing to an isocyclic ring of a monocyclic aliphatic compound having a keto group and a semicyclic double bond has never hitherto been described in the literature. A semicyclic double bond is illustrated in Formula I and refers to double bonded carbon atoms in which only one of the double bonded carbon atoms is in a ring structure. One could not even imagine that such cyclization would be possible. On the one hand, as the semicyclic double bond of γ-dihydroionone has a strong tendency to enter the ring in the presence of protons (hydrogen ions) or hydroxy groups, such ring-closing seemed quite unlikely. On the other hand, it was highly improbable that in the presence of protons the resulting tertiary hydroxy group would be stable enough to avoid the formation of a double bond. However, in spite of these conjectures, the aforesaid ring-closure can be effected by shaking γ-dihydroionone (an isomeric mixture or acid hydrolizable keto derivative thereof as stated above) with diluted strong aqueous acids or by heating the γ-dihydroionone with weak proton-producing substances such as water and weak organic acids, such as phthalic acid, salicylic acid, tartaric acid, benzoic acid, citric acid, oxalic acid, etc. Under these conditions only a small amount of the tertiary alcohol loses its hydroxy group and gives a doubly unsaturated hydrocarbon.

Electrophilic substances, such as $BF_3$ may effect the cyclization of γ-dihydroionone, as well as such ordinary acid proton-producing substances.

The new process is especially interesting when applied to a mixture of α,β,γ-dihydroionones. It then effects the cyclization of the γ-isomer only, leaving the other isomers mainly unchanged, so that they may either be used for the preparation of the said mixture (see copending application Serial No. 422,685), or remain in admixture with the new alcohols, giving a fine smelling composition of matter.

The new process of the present invention also works with γ-dihydroionone in "statu nascendi," that it, with its readily hydrolizable keto derivatives, for example, with its acetal, semi-carbazone or other carbonyl compounds which liberate said γ-dihydroionone under the acid conditions of the cyclization. The only requirement necessary to make use of these compounds, instead of the free ketone, is that they should easily cleave into the ketone under the aforesaid reaction conditions.

The new products of this invention are very valuable for use as perfumes or as raw materials for blending in the perfume industry.

The following examples show how the invention may be performed:

EXAMPLE 1

10 g. of pure synthetic γ-dihydroionone ($d_4^{19.5}=0.9149$; $n_D^{19}=1.4771$) are shaken for 48 hours at about 25° C. with a solution of 20 g. of concentrated $H_2SO_4$ in 100 ml. water. The reaction product is extracted with ether, washed with carbonate and water. The ether solution is dried and the solvent distilled off. The remaining product is heated slowly with 10 g. of B $(OC_2H_5)_3$ for a period of one hour. The ethyl alcohol formed is distilled off, together with the excess of ethylborate at ordinary pressure. Then the non-reacted part of the reaction product is distilled off at 0.01 mm. Hg. pressure. The oil bath is held at a temperature not over 140° C. The molecular distillation increases the yield. The residue of the distillation is saponified with 70 ml. of 10% methanolic KOH in the presence of 10 ml. benzene, for one hour.

The solvents are distilled off and the residue extracted with benzene. Finally, the latter is distilled off and the remaining product rectified.

B. P. 0.25 mm. Hg., 71–72° C.; $d_4^{20}=0.9667$; $n_D^{20}=1.4988$.

$C_{13}H_{22}O$—Calculated: C 80.35; H 11.41%. Found: C 80.13; H 11.37%.

The yield is 9.5 g. The odor of this new product is different from that of natural gray amber and yet it seems to be near to one of its components because of its very strong earthy and moldy odor.

EXAMPLE 2

77.8 g. of a mixture of γ and α-dihydroionones, prepared according to the process of copending application Serial No. 422,685 and having the approximate physical constants: B. P. 0.1 mm. Hg 85° C.; $d_4^{24}=0.920$; $n_D^{24}=1.475$; carbonyl content 95%, are shaken for 48 hours with 800 ml. of a 20% solution of sulfuric acid at about 20–30° C. The reaction product is extracted with ether or benzene. About 76 g. of product is obtained having a ketone content of about 38% (measured by oximation). Therefore, the above treatment has cyclized 95−38= 57% of the ketones. As the α and β-dihydroionones do not show any ring-closing under the above conditions, the γ-dihydroionone content of the raw material was at least $57 \times 77.8 = 44.5$ g. 74 g. of the cyclized product is heated with 80 g. triethylborate. First the temperature is kept at 128° C. It is then gradually raised to 150° C. At the same time, the pressure is lowered from 720 mm. Hg to 15 mm. Hg, and finally 0.1 mm. Hg. After the ethanol is distilled off, 41 g. distils between 128–100° C. under a pressure below 18 mm. Hg and 0.1 mm. Hg. These 41 g. contain about 61% ketone, determined by oximation. 33 g. do not distil. They are saponified with 150 ml. of a solution of 15 g. KOH in methanol and in the presence of 10. ml. benzene. The neutral part is extracted with ether, washed with water, and distilled. 28.6 g. distil at 64–68° C. under 0.1 mm. Hg; $d_4^{25}=0.9618$; $n_D^{23}=1.4985$. Yield of the cyclization calculated on γ-dihydroionone: 64%. This yield may be increased by distilling faster or at a lower temperature, the product which has not reacted with the boric ester, for example, by means of a continuous molecular distillation or by extraction. The yield then reaches 95%. Sulfuric acid may be replaced with advantage as proton-expanding substance by cation-exchange resins, such as described by Swistak, Hastagli and Zafiriadis (Comptes-rendus de l'academie des sciences, Paris, vol. 236, page 2325 (1953)). Other acids than sulfuric acid can also effect the cyclization of γ-dihydroionone.

In the following table are listed different acids together with their cyclization capacity at different concentrations and temperatures. In the last column is indicated the yield of tertiary alcohol:

| Acid | Conc., Percent | ° C. | Time (hours) | Solvent | Cyclization, Percent [1] | Alcohol of Formula III,[2] Percent |
|---|---|---|---|---|---|---|
| Salicylic | 30 | 90 | 1.5 | ethanol/$H_2O$ | 96 | 75 |
| Phthalic | 38 | 99 | 1.3 | $H_2O$ | 90 | 77 |
| Tartaric | 30 | 99 | 1.5 | ethanol/$H_2O$ | 25 | 8 |
| Citric | 30 | 99 | 1.5 | ethanol/$H_2O$ | 29 | 10 |
| Oxalic | 12 | 99 | 0.5 | $H_2O$ | 60 | 65 |
| Oxalic | 12 | 25 | 48 | $H_2O$ | 5 | 4 |

[1] Calculated according to: $\frac{\text{g. } \gamma \text{ dihydroionone removed}}{\text{g. } \gamma \text{ dihydroionone employed}} \times 100$

[2] Calculated according to: $\frac{\text{g. } \gamma \text{ isolated alcohol of Formula III/IV/V}}{\text{g. } \gamma \text{ dihydroionone}} \times 100$ Under the above reaction conditions the reaction product is not stable and undergoes dehydration and resinification. It is therefore important to continue the reaction as long as the yield is increasing and to stop it as soon as it falls.

EXAMPLE 3

5.75 g. of γ-dihydroionone, dissolved in 30 ml. of dry benzene, are treated with a current of 0.6 g. of BF₃. The starting temperature is +4° C. The flask is cooled by a mixture of ice and salt; external temperature —3° C. In three minutes the temperature rises to +9.5° C. After four additional minutes the temperature falls to +6° C. At this moment the current of BF₃ is stopped. Then 50 ml. 10% NaOH are slowly added at a rate so as to maintain the temperature at +3° C. After washing with NaOH and water, the reaction product is dried over $K_2CO_3$ and distilled. 5.25 g. distil under 0.15 mm. Hg at 67–70° C. These 5.25 g. are then heated with 14 g. $B(OC_2H_5)_3$ to maximum 150° C. The alcohol and the $B(OC_2H_5)_3$ in excess are distilled off. The distillation is finally performed in vacuo at 0.5 mm. Hg up to 120° C. The boric ester is saponified with 15 ml. of methanolic KOH (10%) in the presence of 2 ml. of benzene. The resulting reaction product is distilled. B. P. 0.12 mm. Hg at 72–73° C.; $d_4^{22.5}=0.962$; $n_D^{20}=1.498$. Yield 91%.

The allophanates are prepared according to the general method described by Zobrist and Schinz in Helvetica Chimica Acta. Vol. XXXV, page 2385 (1952).

The pure isomers of Formulae III and respectively IV are difficult to obtain because of the mobility of their double bond in the presence of acidic or alkaline reagents. The best way to separate them is the reduction of the dinitrobenzoates or the allophanates with a slight excess of $LiAlH_4$ in tetrahydrofuran. Fractional distillation achieves the purification.

EXAMPLE 4

In Example 1, sulfuric acid may be replaced by phosphoric acid which leads to substantially the same result as sulfuric acid.

To separate the mixture of the two isomers of Formulae III and IV from the isomer of Formula V, a fractional distillation under reduced pressure is best. The isomer of Formula V is enriched in the higher boiling fractions which partly crystallize. The crystallized part is one of the two stereoisomeric compounds of Formula V and melts at 60° C.

Proof of structure

The chemical constitution of 1,1,6-trimethyl-6-hydroxy-1,2,3,5,6,7,8,9-octahydronaphthalene (Formula III) has been proved in the following way:

To 4.17 g. 1,1,6-trimethyl-6-hydroxy-1,2,3,5,6,7,8,9-octahydronaphthalene in 40 ml. $CHCl_3$ is added at —10° C. a solution of 3.44 g. $Br_2$ in 34 ml. $CHCl_3$. After distillation of the $CHCl_3$, the remaining product is dissolved in 30 ml. petroleum ether, then the solvent is removed by distillation in vacuo, the product redissolved in 30 ml. ether, and again distilled. Finally, the product is dissolved in ether, separated from a heavy brown layer of HBr, and poured on a solution of $CH_3MgBr$, made of 7.5 g. Mg and 30 g. $CH_3Br$ in 120 ml. ether. After boiling for 48 hours, the reaction product X is acidulated on ice, extracted with ether and distilled. B. P. 12 mm. 105–110°; 3.24 g. This product is then dehydrogenated over 0.6 g. Pd on charcoal at 260–280° during 20 hours. After extraction with ether, the product is distilled. B. P. 12 mg. Hg 120°; 2.71 g. Trinitrobenzoate M. P. 153–155°. Filtered on $Al_2O_3$, the latter gave the 1,2,4,6-tetramethyl-naphthalene XI, melting at 43–44° C. Mixed melting points of the product, its trinitrobenzoate (M. P. 153–155°) and styphnate (M. P. 133°), as well as the infrared spectrum showed complete identity with a 1,2,4,6-tetramethyl-naphthalene XI prepared from p-methyl-acetophenone VI in the following manner: VI is converted by a Reformatzky reaction, dehydration and saponification, to the acid VII. By an Arndt-Eistert reaction, followed by cyclization with $H_2SO_4$, this acid is successively converted to acid VIII and ketone IX, and finally by Grignard-reaction and dehydration to compound XI.

Trinitrobenzoate $C_{20}H_{19}O_6N_3$—Calculated: C, 60.45%; H, 4.82%. Found: C, 60.32%; H, 4.96%. M. P. 153–155°.

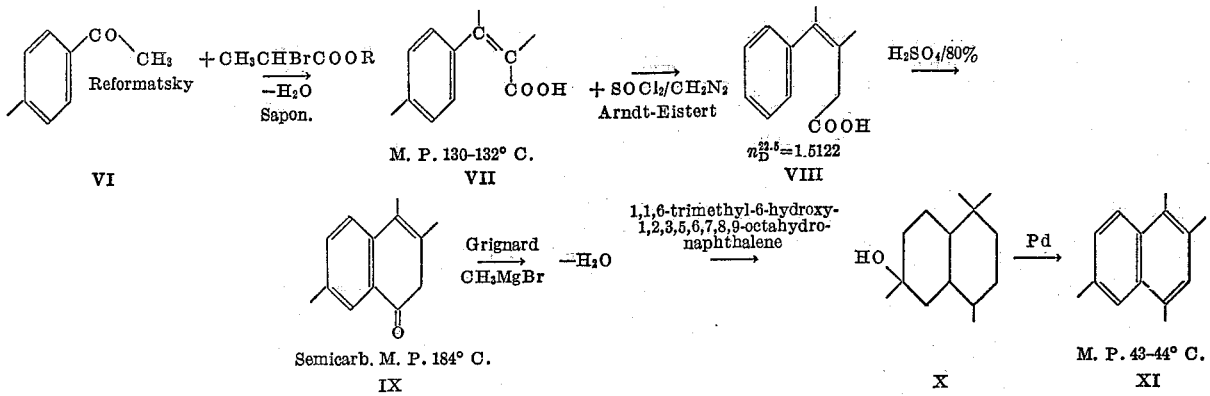

Compound VIII ($C_{13}H_{18}O_2$)—Calculated: C, 75.69%; H, 8.80%. Found: C, 75.68%; H, 8.90%.

Compound IX ($C_{13}H_{16}O$)—Calculated: C, 82.93%; H, 8.57%. Found: C, 82.87%; H, 8.75%.

According to E. Lederer (Bull. Soc. chim. France (5) 14, 345 (1947)), during dehydration one methyl group of the 1,1-gem. dimethyl group of 1,1,6-trimethyl-6-hydroxy-1,2,3,5,6,7,8,9-octahydronaphthalene shifts to the position 2. The methyl group in position 4 shows clearly that the 1,1,6-trimethyl-6-hydroxy-1,2,3,5,6,7,8,9-octahydronaphthalene has the double bond in 4,10 position.

In another proof of structure, 1,1-dimethyl-2,3,4,7,8,9-hexahydrooctalone-6 prepared by Ruzicka and Lardon, Helv. 29, 912 (1946) is first treated with methyl magnesium iodide in a typical Grignard reaction. The resulting product comprised a mixture of a substantial amount of hydrocarbon and a small quantity of tertiary alcohol having a melting point of 60° C. In this reaction no alcohol, other than that shown in Formula V, page 2 of the specification, could be formed. The melting point of the compound of Formula V plus the alcohol of the Grignard synthesis showed that the products were identical as a mixed melting point identification. The lower boiling products are composed of the two other isomers as identified by their infrared spectrum and their catalytic reduction. The tetrasubstituted double bond (Product IV) shows a band at 1670 cm.⁻¹ without corresponding bending vibrations and is not reduced at ordinary pressure and temperature in the presence of $PtO_2$ in ACOH. The trisubstituted double bond (Product III), which is not in the alpha beta position to the hydroxy group, shows a band at 1672 (stretching vibration) and at 830/796 (bending vibration) and is reduced under the named conditions. The fact that the products take up one oxygen to quantitatively produce an epoxide indicates the presence of a double bond in Products IV and III. Their formulas $C_{13}H_{22}O$ must therefore be bicyclic. Moreover, the fact that this bicyclic alcohol is obtained by heating the dehydro-γ-ionone with an aqueous solution of phthalic acid, which usually gives no isomerization and therefore is a very mild reagent and which thereby cannot produce any other change in the carbon skeleton than that shown by Formula II, proves that the structure cannot be other than shown as Formula III and Formula IV. This reasoning is proved to be correct by the mere proven presence of the product of Formula V.

Further details of proof of structure, including infrared diagrams, are available in an article published by us in Helv. Chim. Acta, volume XXXIV, pages 183, 199 (1956).

*Quantitative composition of the obtained mixture*

By fractional distillation, 8–5% of γ-ambrinol (Formula V) can easily be separated from the obtained mixture.

The remaining mixture is then converted to the epoxide by treating it with a solution of 5–8% perphthalic acid in ether at 0° C. By shaking the crude epoxide mixture with a solution of KI and $H_2SO_4$, a crystalline iodohydrine ($C_{13}H_{23}O_2$) is formed, which decomposes at 99° C. Yield 67–70%. The same iodohydrine is formed in 80% yield from pure α-ambrinol epoxide M. P. 57° C. Hence the original mixture contains 81–87% α-ambrinol. The remaining 5–14% are β-ambrinol.

What is claimed is:

1. Compounds selected from the group consisting of 1,1,6 - trimethyl - 6 - hydroxy - 1,2,3,5,6,7,8,9 - octahydronaphthalene having the formula

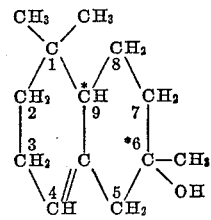

1,1,6 - trimethyl - 6 - hydroxy - 1,2,3,4,5,6,7,8 - octahydronaphthalene having the formula

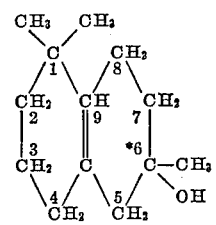

and 1,1,6 - trimethyl - 6 - hydroxy - 1,2,3,4,6,7,8,9 - octahydronaphthalene having the formula

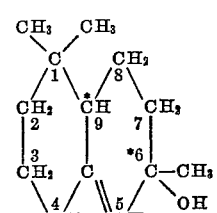

and mixtures thereof.

2. 1,1,6 - trimethyl - 6 - hydroxy - 1,2,3,5,6,7,8,9-octahydronaphthalene having the formula

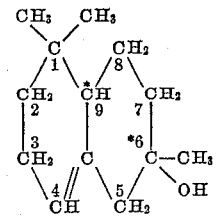

3. 1,1,6 - trimethyl - 6 - hydroxy - 1,2,3,5,6,7,8,9 - octahydronaphthalene having the formula

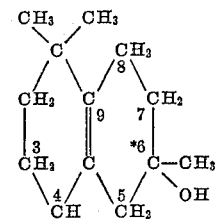

4. A mixture of 1,1,6-trimethyl-6-hydroxy-1,2,3,5,6,7,8,9-octahydronaphthalene having the formula

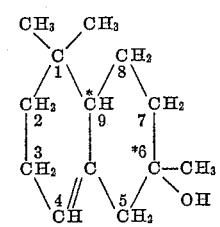

with 1,1,6 - trimethyl - 6 - hydroxy - 1,2,3,4,5,6,7,8 - octahydronaphthalene having the formula

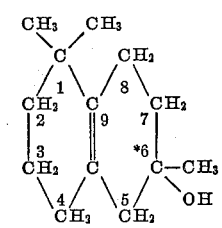

and 1,1,6 - trimethyl - 6 - hydroxy - 1,2,3,4,6,7,8,9 - octahydronaphthalene having the formula

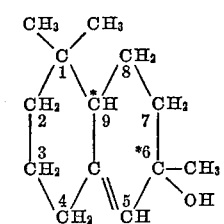

5. A mixture of 1,1,6-trimethyl-6-hydroxy-1,2,3,5,6,7,8,9-octahydronaphthalene having the formula

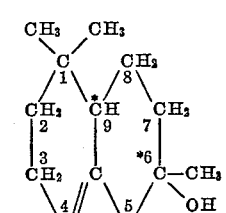

and 1,1,6 - trimethyl - 6 - hydroxy - 1,2,3,5,6,7,8,9 - octahydronaphthalene having the formula

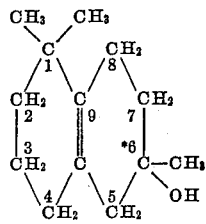

6. A process for preparing a mixture of tertiary alcohols comprising 1,1,6 - trimethyl - 6 - hydroxy - 1,2,3,5,6,7,8,9-octahydronaphthalene having the formula

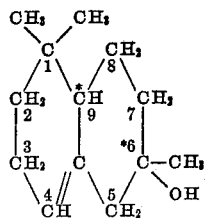

1,1,6 - trimethyl - 6 - hydroxy - 1,2,3,4,5,6,7,8 - octahydronaphthalene having the formula

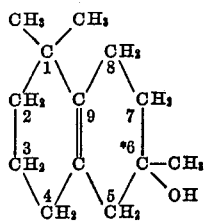

and 1,1,6 - trimethyl - 6 - hydroxy - 1,2,3,4,6,7,8,9 - octahydronaphthalene having the formula

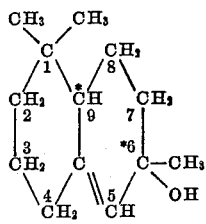

and mixtures thereof, comprising cyclizing a member of the group consisting of gamma dihydroionone, mixtures of gamma dihydroionone with at least one of its isomeric dihydroionones and acid hydrolizable keto derivatives of gamma dihydroionone.

7. The method as defined in claim 6, wherein the cyclization is effected with a cyclizing agent selected from the group consisting of dilute inorganic acids, dilute organic acids, and a dilute solution of boron fluoride.

8. The method as defined in claim 6, wherein the cyclization is effected with a cyclizing agent comprising boron fluoride.

9. The method as defined in claim 6, wherein the cyclization is effected with a cyclizing agent comprising dilute sulfuric acid.

10. The method as defined in claim 6, wherein the cyclization is effected with a cyclizing agent comprising phosphoric acid.

11. The method of forming 1,1,6-trimethyl-6-hydroxy-1,2,3,5,6,7,8,9-octahydronaphthalene having the formula

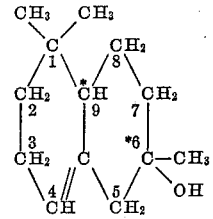

comprising cyclizing a member of the group consisting of gamma dihydroionone, mixtures of gamma dihydroionone with at least one of its isomeric dihydro-ionones and acid hydrolizable keto derivatives of gamma dihydroionone, and separating the 1,1,6-trimethyl-6-hydroxy-1,2,3,5,6,7,8,9-octahydro-naphthalene from the mixture formed.

12. The method of forming 1,1,6-trimethyl-6-hydroxy-1,2,3,4,5,6,7,8-octahydronaphthalene having the formula

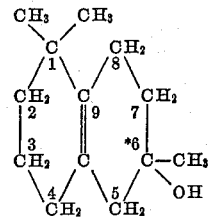

comprising cyclizing a member of the group consisting of gamma dihydroionone, mixtures of gamma dihydroionone with at least one of its isomeric dihydroionones and acid hydrolizable keto derivatives of gamma dihydroionone, and separating the 1,1,6-trimethyl-6-hydroxy-1,2,3,4,5,6,7,8-octahydro-naphthalene from the mixture formed.

13. The method as defined in claim 6, wherein the starting material is an acid hydrolizable keto derivative of gamma dihydroionone.

14. The method as defined in claim 6, wherein the starting material is a mixture of gamma dihydroionone with at least one other isomer of gamma dihydroionone.

15. The method as defined in claim 6, wherein the starting material is gamma dihydroionone.

No references cited.